US011431242B2

(12) United States Patent
Liu et al.

(10) Patent No.: US 11,431,242 B2
(45) Date of Patent: Aug. 30, 2022

(54) OSCILLATION CONTROL CIRCUIT FOR ULTRASONIC ATOMIZATION SHEET AND ULTRASONIC ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Hong Yu, Hunan (CN); Yuangang Dai, Hunan (CN); Xinqiang Yin, Hunan (CN); Jianhua Yi, Hunan (CN); Guangping Cao, Hunan (CN)

(73) Assignee: CHINA TOBACCO HUNAN INDUSTRIAL CO., LTD., Changsha (CN)

( * ) Notice: Subject to any disclaimer, the term of this patent is extended or adjusted under 35 U.S.C. 154(b) by 425 days.

(21) Appl. No.: 16/488,211

(22) PCT Filed: Jan. 5, 2018

(86) PCT No.: PCT/CN2018/071513
§ 371 (c)(1),
(2) Date: Aug. 22, 2019

(87) PCT Pub. No.: WO2018/153171
PCT Pub. Date: Aug. 30, 2018

(65) Prior Publication Data
US 2020/0060337 A1 Feb. 27, 2020

(30) Foreign Application Priority Data

Feb. 24, 2017 (CN) .......................... 201720170890.X
Feb. 24, 2017 (CN) ........................... 201720171231.8
Feb. 24, 2017 (CN) ........................... 201720171235.6

(51) Int. Cl.
*H02M 3/156* (2006.01)
*H02M 3/04* (2006.01)
(Continued)

(52) U.S. Cl.
CPC ............... *H02M 3/04* (2013.01); *A24F 40/05* (2020.01); *A24F 40/53* (2020.01); *H02M 3/156* (2013.01)

(58) Field of Classification Search
None
See application file for complete search history.

(56) References Cited

U.S. PATENT DOCUMENTS

2010/0200008 A1  8/2010  Taieb
2018/0090923 A1*  3/2018  Li ............................ H02H 3/20

FOREIGN PATENT DOCUMENTS

CN   103604189 A    2/2014
CN   203421793 U    2/2014
(Continued)

OTHER PUBLICATIONS

International Search Report issued in International Application No. PCT/CN2018/071513 dated Mar. 28, 2018, 6 pages.

*Primary Examiner* — Jeffery S Zweizig
(74) *Attorney, Agent, or Firm* — Mauriel Kapouytian Woods LLP; Liang Huang; Michael Mauriel

(57) ABSTRACT

The present invention discloses an oscillation control circuit for an ultrasonic atomization sheet, and an ultrasonic electronic cigarette. The oscillation control circuit includes a DC boost module, a separately excited excitation module, and a microcontroller. A power module is connected to the ultrasonic atomization sheet through the DC boost module and the separately excited excitation module, and the separately excited excitation module is electrically connected to the microcontroller.

19 Claims, 8 Drawing Sheets

(51) Int. Cl.
   *A24F 40/05*      (2020.01)
   *A24F 40/53*      (2020.01)

(56) References Cited

FOREIGN PATENT DOCUMENTS

| | | |
|---|---|---|
| CN | 203643774 U | 6/2014 |
| CN | 105661649 A | 6/2016 |
| CN | 105852228 A | 8/2016 |
| CN | 206472855 U | 9/2017 |
| CN | 206482028 U | 9/2017 |
| CN | 206482029 U | 9/2017 |

* cited by examiner

OSCILLATION CONTROL CIRCUIT FOR ULTRASONIC ATOMIZATION SHEET AND ULTRASONIC ELECTRONIC CIGARETTE

CROSS REFERENCE TO RELATED APPLICATIONS

This application is a national phase application of international application number PCT/CN2018/071513 filed on Jan. 5, 2018, which claims priority to Chinese application number 201720170890.X filed on Feb. 24, 2017, Chinese application number 201720171235.6 filed on Feb. 24, 2017, and Chinese application number 201720171231.8 filed on Feb. 24, 2017. The entire contents of these applications are hereby incorporated herein by reference.

FIELD OF THE INVENTION

The present invention particularly relates to an oscillation control circuit for ultrasonic atomization sheet and an ultrasonic electronic cigarette.

BACKGROUND OF THE INVENTION

Self-excited excitation module (conventional three-point capacitance oscillating circuit and conventional three-point inductance oscillating circuit) is adopted in all existing oscillation control circuits for ultrasonic atomization sheets in ultrasonic electronic cigarettes, which leads to low atomization efficiency and high circuit energy losses for the ultrasonic atomization sheets, and the easily over-heated circuit boards can damage corresponding electronic components, therefore a great number of heat sinks are required for heat dissipation, which will increase size and cost of the ultrasonic atomization sheets.

At the same time, the existing oscillation control circuit for ultrasonic atomization sheet cannot monitor the operating state of the ultrasonic atomization sheet. When the ultrasonic atomization sheet is dry burnt or steeped in oil, the self-excited excitation module still continues to excite the ultrasonic atomization sheet to operate, which seriously affect the service life of the ultrasonic atomized sheet, and high use cost.

In addition, the resonant frequency of the ultrasonic atomization sheet is changed by factors such as temperature, but the operating frequency of the ultrasonic atomization sheet in the existing oscillation control circuit is fixed, therefore the existing ultrasonic atomization sheet substantially cannot reach resonant state, which leads to low atomization efficiency and small smoke production.

SUMMARY OF THE INVENTION

Oscillation control circuits for ultrasonic atomization sheets in the existing ultrasonic electronic cigarettes all employ self-excited excitation modules, which leads to low atomization efficiency and high energy losses, and the easily over-heated circuit boards can damage corresponding electronic components; the ultrasonic atomization sheet still operates when it is dry burnt or steeped in oil, which seriously affect the service life of the ultrasonic atomized sheet, and leads to high use cost; and unable to reach resonant state. For the above deficiencies of the prior art, the present invention provides an oscillation control circuit for ultrasonic atomization sheet and an ultrasonic electronic cigarette, where a separately excited excitation module is used to control the oscillation of the ultrasonic atomization sheet, so that the ultrasonic atomization sheet can always operate at resonant point, which brings high operating efficiency and low circuit power losses for the ultrasonic atomization, the circuit board is not easy to generate heat, and the size is small; the ultrasonic atomization sheet does not operate when being dry burnt or steeped in oil, therefore has long service life and low cost.

In order to solve the above technical problems, the technical solution adopted by the present invention is as follows:

An oscillation control circuit for ultrasonic atomization sheet, comprising a DC boost module, a separately excited excitation module, and a microcontroller, wherein a power module is electrically connected to the ultrasonic atomization sheet through the DC boost module and the separately excited excitation module in sequence, and a control terminal of the separately excited excitation module is electrically connected to a first output terminal of the microcontroller.

With the above structure, the power module boosts the voltage to a voltage value required by the ultrasonic atomization sheet through the DC boost module, and then the microcontroller generates a PWM signal to control the separately excited excitation module to operate, so that the excitation oscillation frequency of the separately excited excitation module is identical to the natural frequency of the ultrasonic atomization sheet, the ultrasonic atomization sheet reaches a resonant state and constantly oscillates to atomize tobacco tar, produces smoke for the user. The present invention uses separately excited excitation module to excite the ultrasonic atomization sheet, so that the ultrasonic atomization sheet has high operating efficiency, large amount of smoke and low circuit losses, prevent damage to the corresponding electronic components from over-heated circuit boards, a great number of heat sinks are omitted, the size is greatly reduced, the use cost is greatly reduced, and the circuit is stable, reliable and safe.

Further, a voltage detection module is included, and the ultrasonic atomization sheet is electrically connected to a first input terminal of the microcontroller through the voltage detection module.

With the above structure, the power module boosts the voltage to a voltage value required by the ultrasonic atomization sheet through the DC boost module, and then the microcontroller generates a PWM signal to control the separately excited excitation module to operate, so that the excitation oscillation frequency of the separately excited excitation module is identical to the natural frequency of the ultrasonic atomization sheet, the ultrasonic atomization sheet reaches a resonant state and constantly oscillates to atomize tobacco tar, produces smoke for the user. The voltage detection module is configured to convert the operating current signal of the ultrasonic atomization sheet into a voltage signal, the voltage detection module transmits the detected voltage signal to the microcontroller, the microcontroller compares the voltage values received at two adjacent moments and captures the maximum voltage value as a complete resonant point of the ultrasonic atomization sheet, and then the microcontroller controls the separately excited excitation module to output at a frequency required by the complete resonant point, so that the ultrasonic atomization sheet is in a complete resonant state. The voltage detection module performs continuous detection so that the ultrasonic atomization sheet can always operate efficiently. The oscillating operation of the ultrasonic atomization sheet is excited by the separately excited excitation module, and the ultrasonic atomization sheet is always in resonant state, so that the ultrasonic atomization sheet has high operating efficiency, large amount of smoke and low circuit losses, prevent damage to the corresponding electronic components from over-heated circuit boards, a great number of heat sinks are omitted, the size is greatly reduced, the use cost is greatly reduced, and the circuit is stable, reliable and safe.

Further, a frequency detection module is included, a detection terminal of the frequency detection module is electrically connected to the separately excited excitation module, and an output terminal of the frequency detection module is electrically connected to a second input terminal of the microcontroller.

With the above structure, the power module boosts the voltage to a voltage value required by the ultrasonic atomization sheet through the DC boost module, and then the microcontroller generates a PWM signal to control the separately excited excitation module to operate, so that the excitation oscillation frequency of the separately excited excitation module is identical to the natural frequency of the ultrasonic atomization sheet, the ultrasonic atomization sheet reaches a resonant state and constantly oscillates to atomize tobacco tar, produces smoke for the user. The voltage detection module is configured to convert the operating current signal of the ultrasonic atomization sheet into a voltage signal and detect the voltage signal, the voltage detection module also transmits the detected voltage signal to the microcontroller, the microcontroller compares the voltage values received at two adjacent moments and captures the maximum voltage value as a complete resonant point of the ultrasonic atomization sheet, and then the microcontroller controls the separately excited excitation module to output at a frequency required by the complete resonant point, so that the ultrasonic atomization sheet is in a complete resonant state. The voltage detection module performs continuous detection so that the ultrasonic atomization sheet always operates efficiently. The oscillating operation of the ultrasonic atomization sheet is excited by the separately excited excitation module, and the ultrasonic atomization sheet is always in a resonant state, so that the ultrasonic atomization sheet has high operating efficiency, large amount of smoke and low circuit losses, prevent damage to the corresponding electronic components from over-heated circuit boards, a great number of heat sinks are omitted, the size is greatly reduced, the use cost is greatly reduced, and the circuit is stable, reliable and safe.

The heat generated by the ultrasonic atomization sheet changes constantly during the operation of the ultrasonic atomization sheet, under the circumstances of temperature fluctuation, the voltage value detected by the voltage detection system has a certain delay, so even if the voltage value detected by the voltage detection system is a peak value, there is no guarantee that the ultrasonic atomization sheet can always in a resonant state under the circumstances of temperature fluctuation. In order to avoid the influence of temperature on the operation of the ultrasonic atomization sheet, a frequency detection module is added in the present invention for tracking the relationship between the output frequency of the separately excited excitation module and the operating frequency of the ultrasonic atomization sheet, and feeding back this relationship to the microcontroller, the microcontroller modulates the output frequency of the separately excited excitation module to the operating frequency of the ultrasonic atomization sheet, so that the ultrasonic atomization sheet can always operates at a resonant point, which brings high atomization efficiency and large smoke amount.

Further, a current detection module is included, the DC boost module is electrically connected to the separately excited excitation module through the current detection module, and an output terminal of the current detection module is electrically connected to a third input terminal of the microcontroller.

During the operation of the ultrasonic atomization sheet, the current detection module continuously detects the current of a power supply circuit, when the detected current value is larger than a preset current value (e.g. when the ultrasonic atomization sheet is dry burnt or steeped in oil), the microcontroller controls the separately excited excitation module to stop exciting the ultrasonic atomization sheet to stop operating. By adding current detection module to the circuit the circuit is stable, reliable and safe, the ultrasonic atomization sheet is protected timely, and the ultrasonic atomization sheet is prevented from being damaged.

Further, a control terminal of the DC boost module is electrically connected to a second output terminal of the microcontroller.

With the above structure, the present invention is applicable to different specifications of ultrasonic atomization sheets, different specifications of ultrasonic atomization sheets can all reach resonant state by using microcontroller to modulates the output voltage of the DC boost module and the output frequency of the separately excited excitation module.

As a preferred manner, the separately excited excitation module includes a first diode, a second diode, a first capacitor, a first inductor and a first MOS transistor, anode of the first diode is electrically connected to an output terminal of the DC boost module, a cathode of the first diode is grounded through the first inductor, the first capacitor and the second diode in sequence, the ultrasonic atomization sheet is connected in parallel to each end of the second diode, a drain electrode of the first MOS transistor is connected between the first inductor and the first capacitor, a source electrode of the first MOS transistor is grounded, and agate electrode of the first MOS transistor is electrically connected to the first output terminal of the microcontroller.

As another preferred manner, the separately excited excitation module includes a resistor, a second capacitor, a third capacitor, a second inductor and a second MOS transistor, the DC boost module is grounded through the second inductor, the third capacitor and the second capacitor in sequence, a drain electrode of the second MOS transistor is connected between the second inductor and the third capacitor, a source electrode of the second MOS transistor is grounded through the resistor, a gate electrode of the second MOS transistor is electrically connected to the first output terminal of the microcontroller, one end of the ultrasonic atomization sheet is connected between the second capacitor and the third capacitor, and the other end of the ultrasonic atomization sheet (J) is connected between the drain electrode of the second MOS transistor and the resistor.

As a preferred manner, the separately excited excitation module includes a linear buck chip, an inverter, a first NPN type triode, a second NPN type triode and an MOS transistor, the power module is grounded through a first capacitor, an input terminal of the linear buck chip is connected between the power module and the first capacitor, an output terminal of the linear buck chip is grounded through a second capacitor, the output terminal of the linear buck chip is also grounded through a diode and a third capacitor in sequence, a collector of the second NPN type triode is electrically connected to the output terminal of the linear buck chip through a first resistor, an emitter of the second NPN type triode is grounded through a second resistor and a third resistor in sequence, a base of the second NPN type triode is electrically connected to an output terminal of the inverter through a fourth resistor, a collector of the first NPN type triode is electrically connected to the emitter of the second NPN type triode, a base of the first NPN type triode is electrically connected to the base of the second NPN type triode, the base of the first NPN type triode is grounded through a fifth resistor, and an emitter of the first NPN type triode is grounded; a sixth resistor is connected between a first input terminal of the inverter and a second input terminal of the inverter, the second input terminal of the inverter is electrically connected to a positive power supply terminal of the inverter through a seventh resistor, and the positive power supply terminal of the inverter is connected between the diode and the third capacitor; the first output terminal of the microcontroller is electrically connected to the second input end of the inverter; the DC boost module is grounded through an inductor, a fourth capacitor and a fifth capacitor in sequence, a drain electrode of the MOS transistor is connected between the inductor and the fourth capacitor, gate electrode of the MOS transistor is connected between the second resistor and the third resistor, a first terminal of the ultrasonic atomization sheet is connected between the fourth capacitor and the fifth capacitor, and a second terminal of the ultrasonic atomization sheet and a source electrode of the MOS transistor are both electrically connected to the voltage detection module.

As a preferred manner, the voltage detection module includes a sixth capacitor, a seventh capacitor, an eighth capacitor, an eighth resistor, a ninth resistor, and a tenth resistor; the second terminal of the ultrasonic atomization sheet and the source electrode of the MOS transistor are both grounded through the tenth resistor, the second terminal of the ultrasonic atomization sheet and the source electrode of the MOS transistor are both electrically connected to the first input terminal of the microcontroller through the ninth resistor and the eighth resistor in sequence; one end of the sixth capacitor is connected between the eighth resistor and the first input terminal of the microcontroller, and the other end of the sixth capacitor is grounded; one end of the seventh capacitor and one end of the eighth capacitor are connected between the eighth resistor and the ninth resistor, the other end of the seventh capacitor and the other end of the eighth capacitor are both grounded.

As a preferred manner, the current detection module includes an operational amplifier, a ninth capacitor, a tenth capacitor, an eleventh capacitor, a twelfth capacitor, an eleventh resistor, a twelfth resistor, a thirteenth resistor, and a fourteenth resistor; one end of the ninth capacitor and one end of the tenth capacitor are connected between the DC boost module and one end of the eleventh resistor, the other end of the ninth capacitor and the other end of the tenth capacitor are both grounded, the other end of the eleventh resistor is connected to the separately excited excitation module and electrically connected to the reversed-phase input terminal of the operational amplifier through the fourteenth resistor, the in-phase input terminal of the operational amplifier is electrically connected to the DC boost module through the twelfth resistor, an output terminal of the operational amplifier is electrically connected to the third input end of the microcontroller through the thirteenth resistor, and the third input terminal of the microcontroller is also grounded through the eleventh capacitor; and the positive power supply terminal of the operational amplifier is grounded through the twelfth capacitor. As another preferred manner, the current detection module includes a Hall current sensor, a thirteenth capacitor, a fourteenth capacitor, a fifteenth capacitor, a sixteenth capacitor and a fifteenth resistor, one end of the thirteenth capacitor and one end of the fourteenth capacitor are electrically connected to the DC boost module, the other end of the thirteenth capacitor and the other end of the fourteenth capacitor are both grounded, the DC boost module is electrically connected to the separately excited excitation module through the Hall current sensor, an output terminal of the Hall current sensor is grounded through the fifteenth resistor and the sixteenth capacitor in sequence, the third input terminal of the microcontroller is connected between the fifteenth resistor and the sixteenth capacitor, and the positive power supply terminal of the Hall current sensor is grounded through the fifteenth capacitor.

As a preferred manner, the separately excited excitation module includes a linear buck chip, an inverter, a first NPN type triode, a second NPN type triode and an MOS transistor, the power module is grounded through a first capacitor, an input terminal of the linear buck chip is connected between the power module and the first capacitor, an output terminal of the linear buck chip is grounded through a second capacitor, the output terminal of the linear buck chip is also grounded through a first diode and a third capacitor in sequence, collector of the second NPN type triode is electrically connected to the output terminal of the linear buck chip through a first resistor, emitter of the second NPN type triode is grounded through a second resistor and a third resistor in sequence, base of the second NPN type triode is electrically connected to an output terminal of the inverter through a fourth resistor, collector of the first NPN type triode is electrically connected to the emitter of the second NPN type triode, base of the first NPN type triode is electrically connected to the base of the second NPN type triode, base of the first NPN type triode is grounded through a fifth resistor, and emitter of the first NPN type triode is grounded; a sixth resistor is connected between a first input terminal of the inverter and a second input terminal of the inverter, the second input terminal of the inverter is electrically connected to a positive power supply terminal of the inverter through a seventh resistor, and the positive power supply terminal of the inverter is connected between the first diode and the third capacitor; the first output terminal of the microcontroller is electrically connected to the second input terminal of the inverter; the DC boost module is grounded through an inductor, a fourth capacitor and a fifth capacitor in sequence, a drain electrode of the MOS transistor is connected between the inductor and the fourth capacitor, a gate electrode of the MOS transistor is connected between the second resistor and the third resistor, a first terminal of the ultrasonic atomization sheet is connected between the fourth capacitor and the fifth capacitor, and a second terminal of the ultrasonic atomization sheet and a source electrode of the MOS transistor are both electrically connected to the voltage detection module.

As a preferred manner, the voltage detection module includes a sixth capacitor, a seventh capacitor, an eighth capacitor, an eighth resistor, a ninth resistor, and a tenth resistor; the second terminal of the ultrasonic atomization sheet and the source electrode of the MOS transistor are both grounded through the tenth resistor, and the second end of the ultrasonic atomization sheet and the source electrode of the MOS transistor are both electrically connected to the first input terminal of the microcontroller through the ninth resistor and the eighth resistor in sequence; one end of the sixth capacitor is connected between the eighth resistor and the first input terminal of the microcontroller, and the other end of the sixth capacitor is grounded; one end of the seventh capacitor and one end of the eighth capacitor are both connected between the eighth resistor and the ninth resistor, and the other end of the seventh capacitor and the other end of the eighth capacitor are both grounded.

As a preferred manner, the frequency detection module includes a ninth capacitor, a tenth capacitor, an eleventh capacitor, a second diode, a third diode, an eleventh resistor, a twelfth resistor, and a thirteenth resistor; a drain electrode of the MOS transistor is electrically connected to anode of the third diode, one end of the ninth capacitor and one end of the tenth capacitor are both grounded, the other end of the ninth capacitor and the other end of the tenth capacitor are both electrically connected to a cathode of the third diode, the eleventh resistor and the twelfth resistor are connected into a series branch, one end of the series branch is electrically connected to the cathode of the third diode, the other end of the series branch is grounded, one end of the thirteenth resistor is connected between the eleventh resistor and the twelfth resistor, the other end of the thirteenth resistor is grounded through the eleventh capacitor, and the second input terminal of the microcontroller is connected between the thirteenth resistor and the eleventh capacitor; anode of the second diode is connected between the eleventh resistor and the twelfth resistor, and a cathode of the second diode is electrically connected to the power module.

Based on the same inventive concept, the present invention also provides an ultrasonic electronic cigarette, which includes the oscillation control circuit for ultrasonic atomization sheet.

Compared with the prior art, the present invention makes the ultrasonic atomization sheet can always in resonant state by using separately excited excitation module to control the oscillation of the ultrasonic atomization sheet, which not only eliminates the influence of temperature on the operating efficiency of the ultrasonic atomization sheet, but also brings high atomization efficiency, large smoke amount and low circuit losses for the ultrasonic atomization sheet, the circuit board is not easy to generate heat, small size and low cost, meanwhile, the circuit is stable, reliable and safe, and the ultrasonic atomization sheet has a long service life.

In which, 1 power module, 2 microcontroller, 3 separately excited excitation module, 4 DC boost module, 5 voltage detection module, 6 current detection module, 7 frequency detection module, C1 first capacitor, C2 second capacitor, C3 third capacitor, C4 fourth capacitor, C5 fifth capacitor, C6 sixth capacitor, C7 seventh capacitor, C8 eighth capacitor, C9 ninth capacitor, C10 tenth capacitor, C11 eleventh capacitor, C12 twelfth capacitor, C13 thirteenth capacitor, C14 fourteenth capacitor, C15 fifteenth capacitor, C16 sixteenth capacitor, D diode, D1 first diode, D2 second diode, D3 third diode, J ultrasonic atomization sheet, L inductor, L1 first inductor, L2 second inductor, Q1 first NPN type triode, Q2 second NPN type triode, Q3 MOS transistor, Q4 first MOS transistor, Q5 second MOS transistor, R resistor, R1 first resistor, R2 second resistor, R3 third resistor, R4 fourth resistor, R5 fifth resistor, R6 sixth resistor, R7 seventh resistor, R8 eighth resistor, R9 ninth resistor, R10 tenth resistor, R11 eleventh resistor, R12 twelfth resistor, R13 thirteenth resistor, R14 fourteenth resistor, R15 fifteenth resistor, U1 inverter, U2 linear buck chip, U3 operational amplifier, U4 Hall current sensor.

DETAILED DESCRIPTION OF EMBODIMENTS

Figure 1:
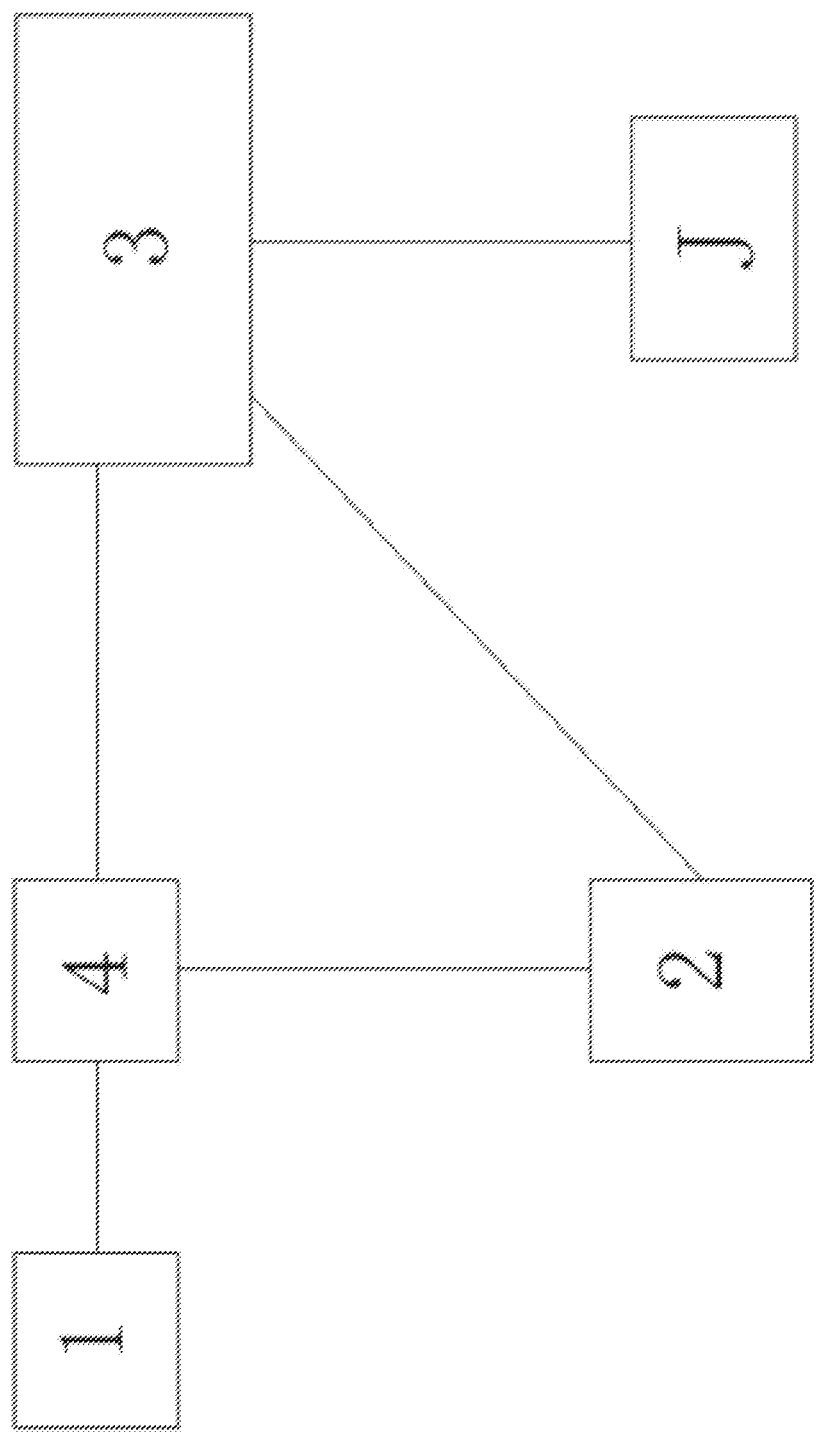
FIG. 1 is a block diagram of the first type of oscillation control circuit for ultrasonic atomization sheet.

As shown in FIG. 1, an oscillation control circuit for ultrasonic atomization sheet in an ultrasonic electronic cigarette of the present invention includes a DC boost module 4, a separately excited excitation module 3, and a microcontroller 2. A power module 1 is electrically connected to the ultrasonic atomization sheet J through the DC boost module 4 and the separately excited excitation module 3 in sequence, a control terminal of the separately excited excitation module 3 is electrically connected to a first output terminal of the microcontroller 2, and a control terminal of the DC boost module 4 is electrically connected to a second output terminal of the microcontroller 2.

The power module 1 boosts the operating voltage required by the ultrasonic atomization sheet J through the DC boost module 4 under the regulation control of the microcontroller 2, and then outputs the boosted voltage to the high-frequency separately excited excitation module 3, the microcontroller 2 provides constant operating frequency output to the high-frequency separately excited excitation module 3 according to the characteristics of a transducer, which makes the excitation oscillation frequency of the high-frequency separately excited excitation module 3 is identical to the natural frequency of the ultrasonic atomization sheet J, so that the ultrasonic atomization sheet J reaches a resonant state, and ultrasonically atomizes tobacco tar to produce smoke. The ultrasonic atomization sheet J is a piezoelectric ceramic sheet.

Figure 2:
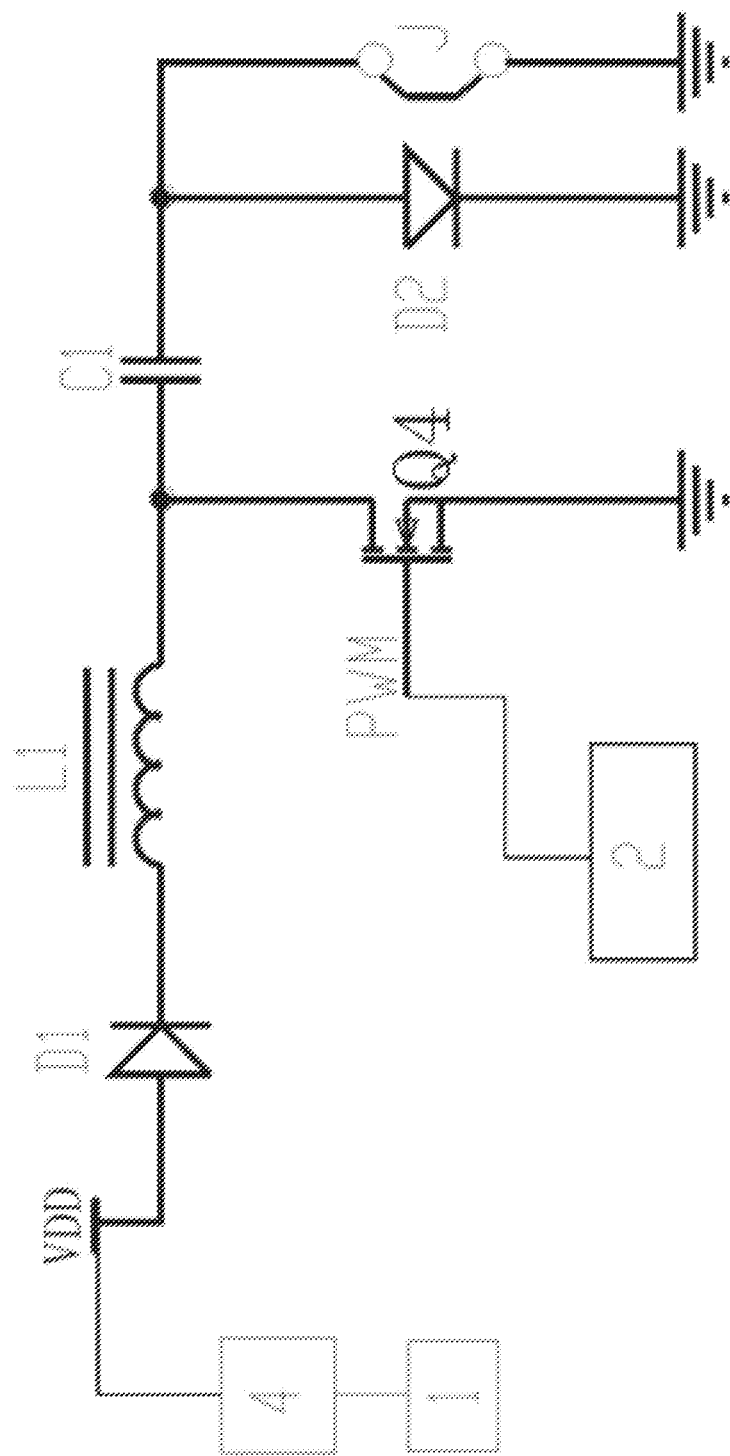
FIG. 2 is a schematic circuit diagram of the oscillation control circuit for ultrasonic atomization sheet of embodiment 1 oscillation control circuit for ultrasonic atomization sheet.

FIG. 2 shows a schematic circuit diagram of the oscillation control circuit for ultrasonic atomization sheet of embodiment 1. The separately excited excitation module 3 includes a first diode D1, a second diode D2, a first capacitor C1, a first inductor L1, and a first MOS transistor Q4. The first inductor L1 is an energy storage inductor, the first capacitor C1 is an energy storage capacitor, the first MOS transistor Q4 is a high speed switching MOS transistor, the first diode D1 is an anti-reverse diode, and the second diode D2 is a conduction diode. An anode of the first diode D1 is electrically connected to an output terminal of the DC boost module 4, and a cathode of the first diode D1 is grounded through the first inductor L1, the first capacitor C1 and the second diode D2 in sequence. The ultrasonic atomization sheet J is connected in parallel to two ends of the second diode D2. A drain electrode of the first MOS transistor Q4 is connected between the first inductor L1 and the first capacitor C1, a source electrode of the first MOS transistor Q4 is grounded, and a gate electrode of the first MOS transistor Q4 is electrically connected to a first output terminal of the microcontroller 2.

The operating principle of the circuit in FIG. 2 is as follows:

During the switch-on period of the first MOS transistor Q4, DC power supply stores electric energy in the first inductor L1, the current flow is DC power supply VCC-→first diode D1→first inductor L1→first MOS transistor Q4→ground; During the switch-off period of the first MOS transistor Q4, electric energy stored in the first inductor L1 is transferred to the first capacitor C1, the current flow is DC power supply VCC→first diode D1→first inductor L1→first capacitor C1→second diode D2→ground; after the first capacitor C1 is fully charged, the first MOS transistor Q4 is turned on again, a left end of the first capacitor C1 is forcibly pulled to a ground potential, and because the voltage cross two ends of the first capacitor C1 cannot change suddenly, the electric energy is released through the ultrasonic atomization sheet J, and the ultrasonic atomization sheet J is excited to oscillate and ultrasonically atomize tobacco tar, where the current flow is ground on the left end of the first capacitor C1→ultrasonic atomization sheet J→a right end of the first capacitor C1.

Figure 3:
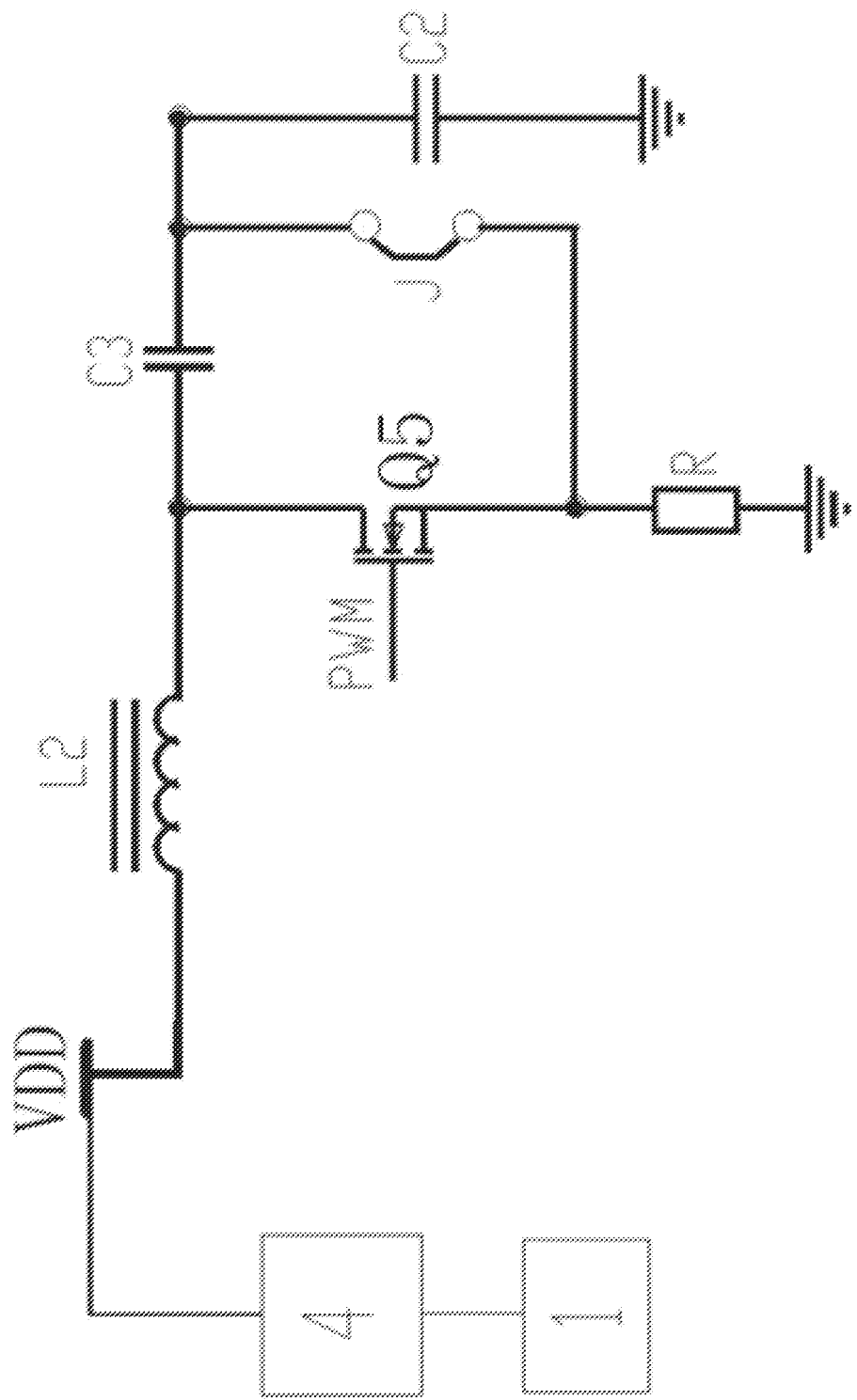
FIG. 3 is a schematic circuit diagram of the oscillation control circuit for ultrasonic atomization sheet of embodiment 2.

FIG. 3 shows a schematic circuit diagram of the oscillation control circuit for ultrasonic atomization sheet of embodiment 2. The separately excited excitation module 3 includes a resistor R, a second capacitor C2, a third capacitor C3, a second inductor L2, and a second MOS transistor Q5. The second inductor L2 is an energy storage inductor, the third inductor is an energy storage capacitor, the second MOS transistor Q5 is a high speed switching MOS transistor, the resistor R is a current limiting resistor R, and the second capacitor C2 is a shunt capacitor. The DC boost module 4 is grounded through the second inductor L2, the third capacitor C3 and the second capacitor C2 in sequence. A drain electrode of the second MOS transistor Q5 is connected between the second inductor L2 and the third capacitor C3, a source electrode of the second MOS transistor Q5 is grounded through the resistor R, a gate electrode of the second MOS transistor Q5 is electrically connected to the first output terminal of the microcontroller 2. One end of the ultrasonic atomization sheet J is connected between the second capacitor C2 and the third capacitor C3, the other end of the ultrasonic atomization sheet J is connected between the drain electrode of the second MOS transistor Q5 and the resistor R.

The Operating Principle of the Circuit in FIG. 3 is as Follows:

During the switch-on period of the second MOS transistor Q5, DC power supply stores electric energy in the first inductor L2, the current flow is DC power supply VCC-→second inductor L2→second MOS transistor 05→resistor R→ground; During the switch-off period of the second MOS transistor Q5 electric energy stored in the second inductor L2 is transferred to the third capacitor C3, the current flow is DC power VCC→second inductor L2→third capacitor C3→second capacitor C2//(the ultrasonic atomization sheet J→resistor R)→ground; after the third capacitor C3 is fully charged, the second MOS transistor Q5 is turned on again, left end of the third capacitor C3 is forcibly pulled to near ground potential, and because the voltage cross two ends of the third capacitor C3 cannot change suddenly, the electric energy is released through the ultrasonic atomization sheet J, and the ultrasonic atomization sheet is excited to oscillate and ultrasonically atomize tobacco tar, where the current flow is a right end of the third capacitor C3→ (ultrasonic atomization sheet J→resistor R)//second capacitor C2→ground at the left end of the third capacitor C3.

Figure 4:
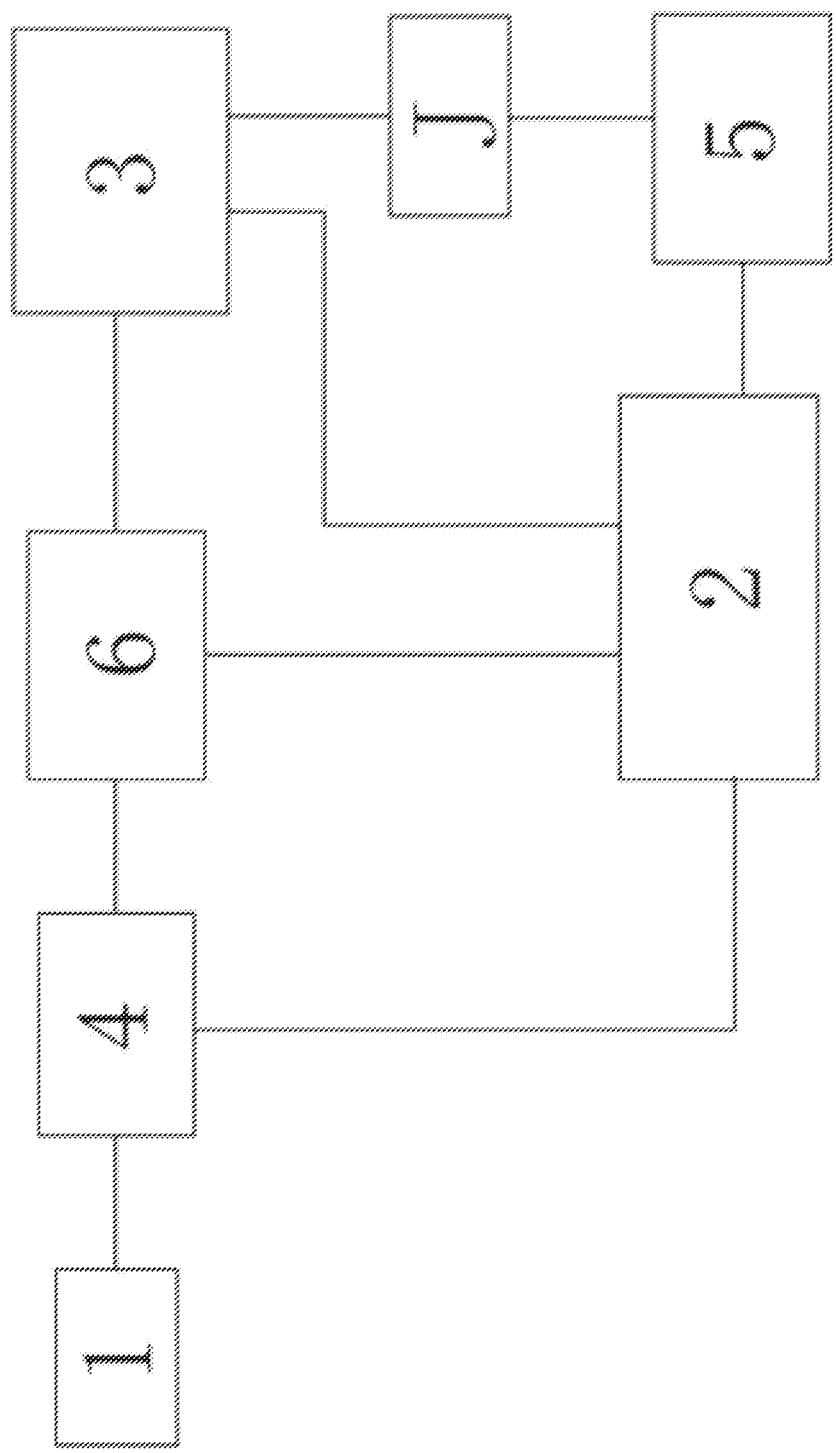
FIG. 4 is a block diagram of the second type of oscillation control circuit for ultrasonic atomization sheet.

As shown in FIG. 4, the oscillation control circuit for ultrasonic atomization sheet in the ultrasonic electronic cigarette of the present invention includes a DC boost module 4, a separately excited excitation module 3, a microcontroller 2, and a voltage detection module 5. A power module 1 is electrically connected to the ultrasonic atomization sheet J through the DC boost module 4 and the separately excited excitation module 3 in sequence, a control terminal of the separately excited excitation module 3 is electrically connected to a first output terminal of the microcontroller 2, the ultrasonic atomization sheet J is electrically connected to a first input terminal of the microcontroller 2 through the voltage detection module 5, and a control terminal of the DC boost module 4 is electrically connected to a second output terminal of the microcontroller 2.

The power module 1 boosts the operating voltage required by the ultrasonic atomization sheet J through the DC boost module 4 under the regulation control of the microcontroller 2, and then outputs the boosted voltage to the high-frequency separately excited excitation module 3, the microcontroller 2 provides constant operating frequency output to the high-frequency separately excited excitation module 3 according to the characteristics of a transducer, which makes excitation oscillation frequency of the high-frequency separately excited excitation module 3 is identical to the natural frequency of the ultrasonic atomization sheet J, so that the ultrasonic atomization sheet J reaches a resonant state, and ultrasonically atomizes tobacco tar to produce smoke. The ultrasonic atomization sheet J is a piezoelectric ceramic sheet.

The voltage detection module 5 is configured to convert the operating current signal of the ultrasonic atomization sheet J into a voltage signal and detect the voltage signal, the voltage detection module 5 also transmits the detected voltage signal to the microcontroller 2, the microcontroller 2 compares the voltage values received at two adjacent moments and captures the maximum voltage value as a complete resonant point of the ultrasonic atomization sheet J, and then the microcontroller 2 controls the separately excited excitation module 3 to output at a frequency required by the complete resonant point, so that the ultrasonic atomization sheet J is in a complete resonant state. The voltage detection module 5 performs continuous detection so that the ultrasonic atomization sheet J always operates efficiently.

A current detection module 6 is further included in FIG. 4, the DC boost module 4 is electrically connected to the separately excited excitation module 3 through the current detection module 6, an output terminal of the current detection module 6 is electrically connected to a third input terminal of the microcontroller 2.

Figure 5:
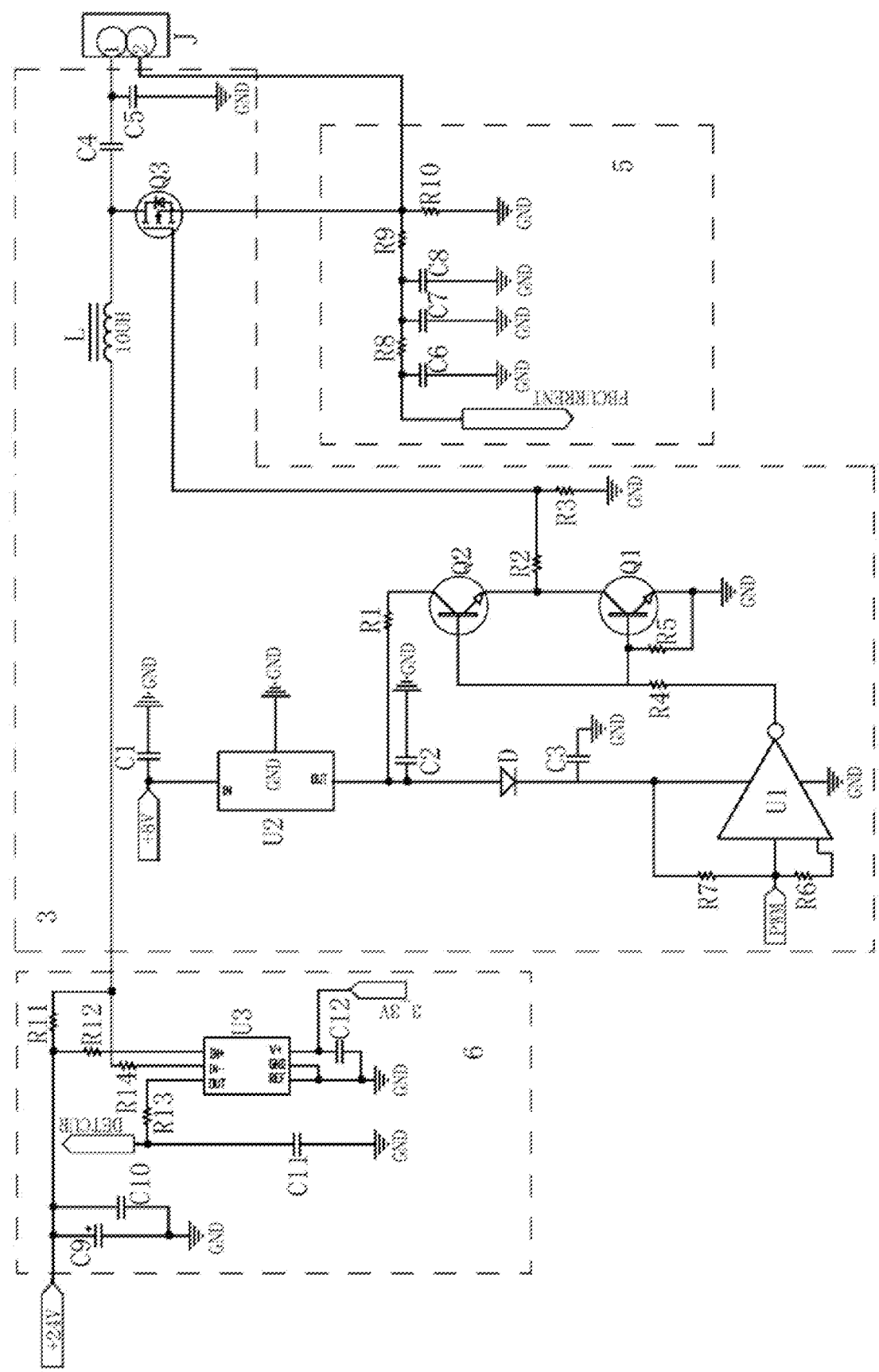
FIG. 5 is a schematic circuit diagram of the oscillation control circuit for ultrasonic atomization sheet of embodiment 3.

During the operation of the ultrasonic atomization sheet J, the current detection module 6 continuously detects the current of a power supply circuit, when the detected current value is larger than a preset current value (e.g. the ultrasonic atomization sheet J is dry burnt or steeped in oil, the detected current value is 3-5 times larger than the preset current value), the microcontroller 2 judges the state (dry burnt or steeped in oil) of the ultrasonic atomization sheet J at the moment based on the current value. During dry burning, the detected current value rapidly increases to 3-5 times the preset current value; during steeping in oil, the detected current value slowly increases to 3-5 times the preset current value; finally, the microcontroller 2 controls the separately excited excitation module 3 to stop exciting the ultrasonic atomization sheet J to stop operating. FIG. 5 shows a schematic circuit diagram of the oscillation control circuit for ultrasonic atomization sheet of embodiment 3. The separately excited excitation module 3 includes an LDO linear buck chip U2, an inverter U1, a first NPN type triode Q1, a second NPN type triode Q2, and an MOS transistor Q3. A power module 1 is grounded through a first capacitor C1, an input terminal of the linear buck chip U2 is connected between the power module 1 and the first capacitor C1, an output terminal of the linear buck chip U2 is grounded through a second capacitor C2, and the output terminal of the linear buck chip U2 is also grounded through a diode D and a third capacitor C3 in sequence. A collector of the second NPN type triode Q2 is electrically connected to the output terminal of the linear buck chip U2 through a first resistor R1, an emitter of the second NPN type triode Q2 is grounded through a second resistor R2 and a third resistor R3 in sequence, and a base of the second NPN type triode Q2 is electrically connected to an output terminal of the inverter U1 through a fourth resistor R4. A collector of the first NPN type triode Q1 is electrically connected to the emitter of the second NPN type triode Q2, a base of the first NPN type triode Q1 is electrically connected to the base of the second NPN type triode Q2, the base of the first NPN type triode Q1 is grounded through a fifth resistor R5, and emitter of the first NPN type triode Q1 is grounded. A sixth resistor R6 is connected between a first input terminal of the inverter U1 and a second input terminal of the inverter U1, the second input terminal of the inverter U1 is electrically connected to a positive power supply terminal of the inverter U1 through a seventh resistor R7, and the positive power supply terminal of the inverter U1 is connected between the diode D and the third capacitor C3. The first output terminal of the microcontroller 2 is electrically connected to the second input terminal of the inverter U1. The DC boost module 4 is grounded through an inductor L, a fourth capacitor C4 and a fifth capacitor C5 in sequence. A drain electrode of the MOS transistor Q3 is connected between the inductor L and the fourth capacitor C4, a gate electrode of the MOS transistor Q3 is connected between the second resistor R2 and the third resistor R3, a first terminal of the ultrasonic atomization sheet J is connected between the fourth capacitor C4 and the fifth capacitor C5, and a second terminal of the ultrasonic atomization sheet J and a source electrode of the MOS transistor Q3 are electrically connected to the voltage detection module 5.

The high-frequency separately excited excitation module 3 is composed of a signal driving portion and a high-frequency oscillation portion. The signal driving portion is composed of the inverter U1, the sixth resistor R6, the seventh resistor R7, the fourth resistor R4, the fifth resistor R5, the first resistor R1, the second resistor R2, the third resistor R3, the second NPN type triode Q2, and the first NPN type transistor Q1. The PWM signal outputted by the microcontroller 2 is phase reversed by the inverter U1 to form a stable square wave signal, and provides sufficient drive current to drive a totem circuit composed of the second NPN type triode Q2 and the first NPN type triode Q1. During the low-level period of the PWM, the second NPN type triode Q2 is turned on to drive the back high-frequency MOS transistor Q3 to operate. During the high-level period of the PWM, gate electrode of the high-frequency MOS transistor Q3 is conducted to the ground through the first NPN type triode Q1 for rapid discharge, to turn off the high-frequency MOS transistor Q3 quickly.

The voltage detection module 5 includes a sixth capacitor C6, a seventh capacitor C7, an eighth capacitor C8, an eighth resistor R8, a ninth resistor R9, and a tenth resistor R10, where the tenth resistor R10 is a sampling resistor, the eighth resistor R8, the ninth resistor R9, the eighth capacitor C8, the seventh resistor R7 and the sixth resistor R6 compose a second-order RC filter network. The second end of the ultrasonic atomization sheet J and the source of the MOS transistor Q3 are grounded through the tenth resistor R10, the second end of the ultrasonic atomization sheet J and the source of the MOS transistor Q3 are electrically connected to the first input terminal of the microcontroller 2 through the ninth resistor R9 and the eighth resistor R8 in sequence; one end of the sixth capacitor C6 is connected between the eighth resistor R8 and the first input terminal of the microcontroller 2, and the other end of the sixth capacitor C6 is grounded; one end of the seventh capacitor C7 and one end of the eighth capacitor C8 are connected between the eighth resistor R8 and the ninth resistor R9, and the other end of the seventh capacitor C7 and the other end of the eighth capacitor C8 are both grounded.

The current detection module 6 includes an operational amplifier U3, a ninth capacitor C9, a tenth capacitor C10, an eleventh capacitor C11, a twelfth capacitor C12, an eleventh resistor R11, a twelfth resistor R12, a thirteenth resistor R13, and a fourteenth resistor R14, where the eleventh resistor R11 is a sampling resistor, and the thirteenth resistor R13 and the eleventh capacitor C11 compose a filter network. One end of the ninth capacitor C9 and one end of the tenth capacitor C10 are connected between the DC boost module 4 and one end of the eleventh resistor R11, the other end of the ninth capacitor C9 and the other end of the tenth capacitor C10 are grounded, the other end of the eleventh resistor R11 is connected to the separately excited excitation module 3 and electrically connected to the reversed-phase input terminal of the operational amplifier U3 through the fourteenth resistor R14, the in-phase input terminal of the operational amplifier U3 is electrically connected to the DC boost module 4 through the twelfth resistor R12, an output terminal of the operational amplifier U3 is electrically connected to the third input terminal of the microcontroller 2 through the thirteenth resistor R13, and the third input terminal of the microcontroller 2 is also grounded through the eleventh capacitor C11; and the positive power supply terminal of the operational amplifier U3 is grounded through the twelfth capacitor C12.

The Operating Principle of the Circuit in FIG. 5 is as Follows:

The current outputted by an output circuit generates a voltage cross two ends of the eleventh resistor R11, the voltage is amplified by the operational amplifier U3 and then passes through the filter network composed of the thirteenth resistor R13 and the eleventh capacitor C11 to become a waveform-stable DC voltage signal, and the current flowing through the ultrasonic atomization sheet J is proportional to the voltage cross two ends of the tenth resistor R10. The microcontroller 2 can monitor the magnitude of the output current through AD conversion, detect whether the ultrasonic atomization sheet J is in a complete resonant state in real time, and modulates the frequency and duty ratio of the PWM output to achieve the optimal output of the ultrasonic atomization sheet J, thereby improving the operating efficiency.

Figure 6:
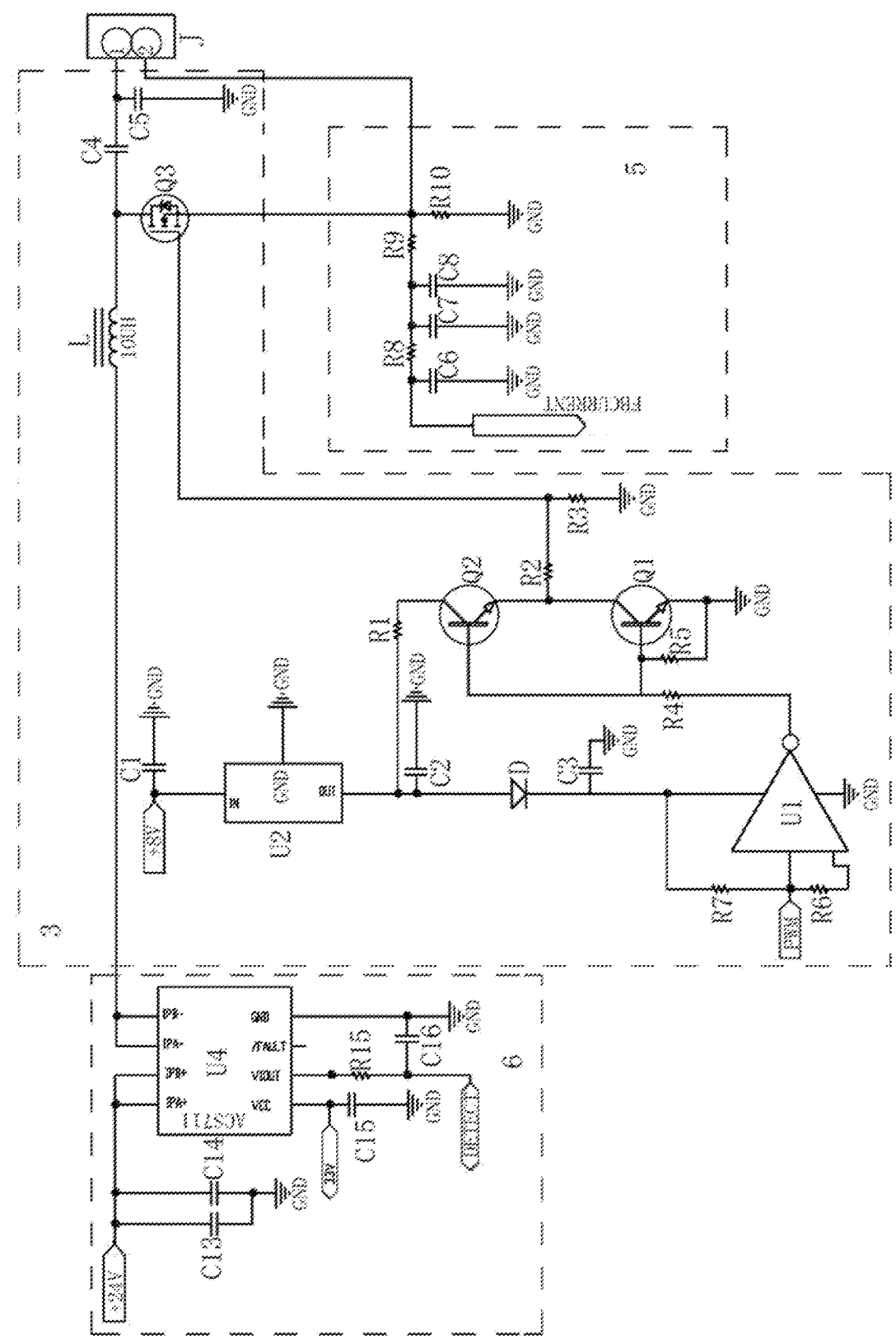
FIG. 6 is a schematic circuit diagram of the oscillation control circuit for ultrasonic atomization sheet of embodiment 4.

FIG. 6 shows a schematic circuit diagram of the oscillation control circuit for ultrasonic atomization sheet of embodiment 4. The difference between FIG. 6 and FIG. 5 is the different structure of current detection module 6. The current detection module 6 includes a Hall current sensor U4, a thirteenth capacitor C13, a fourteenth capacitor C14, a fifteenth capacitor C15, a sixteenth capacitor C16, and a fifteenth resistor R15. One end of the thirteenth capacitor C13 and one end of the fourteenth capacitor C14 are electrically connected to the DC boost module 4, the other end of the thirteenth capacitor C13 and the other end of the fourteenth capacitor C14 are both grounded, the DC boost module 4 is electrically connected to the separately excited excitation module 3 through the Hall current sensor U4, an output terminal of the Hall current sensor U4 is grounded through the fifteenth resistor R15 and the sixteenth capacitor C16 in sequence, the third input terminal of the microcontroller 2 is connected between the fifteenth resistor R15 and the sixteenth capacitor C16, the positive power supply terminal of the Hall current sensor U4 is grounded through the fifteenth capacitor C15. The operating principle of the circuit in FIG. 6 is as follows:

The current detection module 6 is realized by the conventional Hall current sensor U4, the current signal of the output circuit is converted into a voltage signal by the Hall current sensor U4 for outputting; the voltage signal is proportional to the current of the output circuit. Similar to FIG. 5, the microcontroller 2 can monitor the magnitude of the output current through AD conversion, detect whether the ultrasonic atomization sheet J is in a complete resonant state in real time, and modulate the frequency and duty ratio of the PWM output to achieve the optimal output of the ultrasonic atomization sheet J, thereby improving the operating efficiency.

Figure 7:
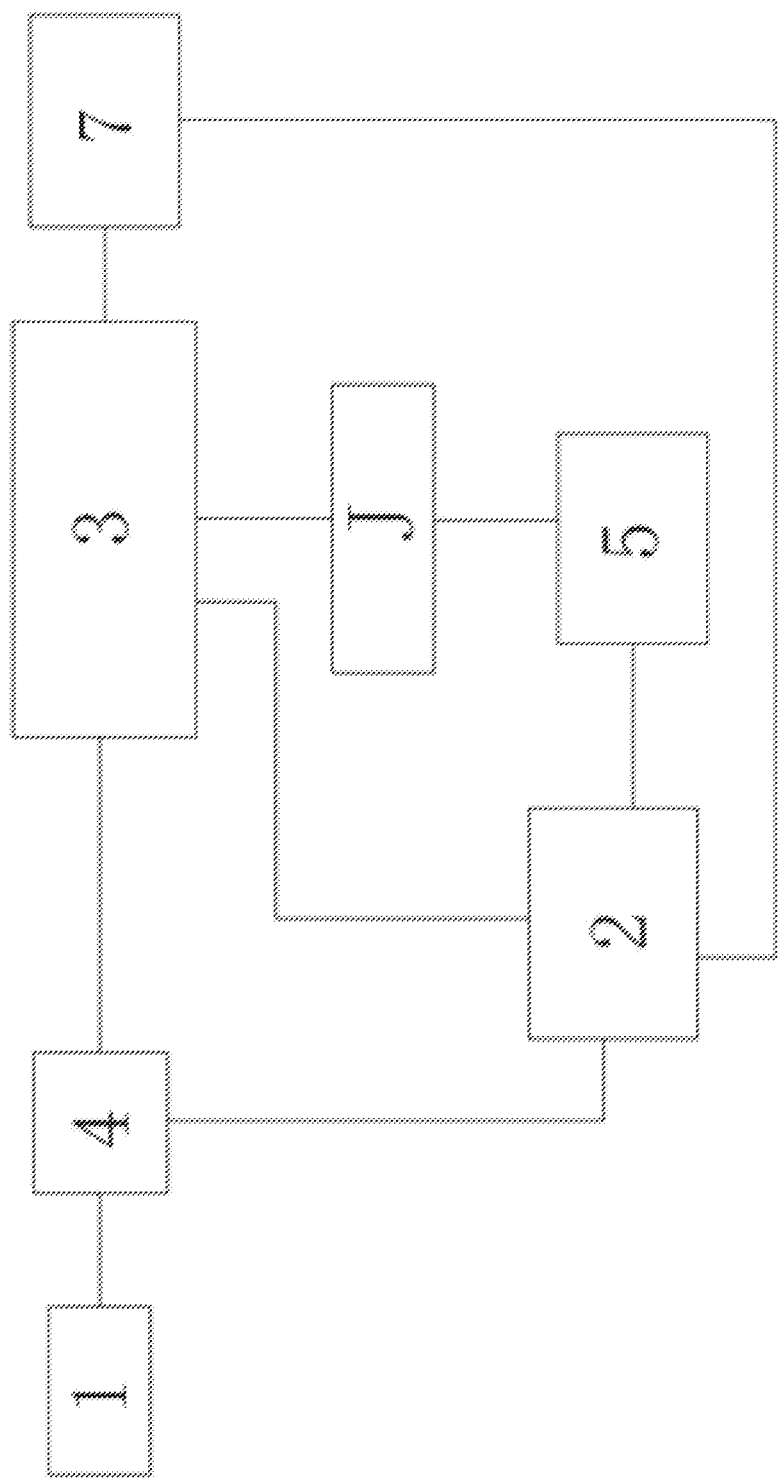
FIG. 7 is a block diagram of the third type of oscillation control circuit for ultrasonic atomization sheet.

As shown in FIG. 7, the oscillation control circuit for ultrasonic atomization sheet in the ultrasonic electronic cigarette of the present invention includes a DC boost module 4, a separately excited excitation module 3, a microcontroller 2, a voltage detection module 5, and a frequency detection module 7. A power module 1 is electrically connected to the ultrasonic atomization sheet J through the DC boost module 4 and the separately excited excitation module 3 in sequence, a control terminal of the separately excited excitation module 3 is electrically connected to a first output terminal of the microcontroller 2, the ultrasonic atomization sheet J is electrically connected to a first input terminal of the microcontroller 2 through the voltage detection module 5, a detection terminal of the frequency detection module 7 is electrically connected to the separately excited excitation module 3, an output terminal of the frequency detection module 7 is electrically connected to a second input terminal of the microcontroller 2, and a control terminal of the DC boost module 4 is electrically connected to a second output terminal of the microcontroller 2.

The power module 1 boosts the operating voltage required by the ultrasonic atomization sheet J through the DC boost module 4 under the regulation control of the microcontroller 2, then outputs the boosted voltage to the high-frequency separately excited excitation module 3, the microcontroller 2 provides constant operating frequency output to the high-frequency separately excited excitation module 3 according to the characteristics of a transducer, which makes the excitation oscillation frequency of the high-frequency separately excited excitation module 3 is identical to the natural frequency of the ultrasonic atomization sheet J, so that the ultrasonic atomization sheet J reaches a resonant state, and ultrasonically atomizes tobacco tar to produce smoke. The ultrasonic atomization sheet J is a piezoelectric ceramic sheet.

The voltage detection module 5 is configured to convert the operating current signal of the ultrasonic atomization sheet J into a voltage signal and detect the voltage signal, the voltage detection module 5 also transmits the detected voltage signal to the microcontroller 2, the microcontroller 2 compares the voltage values received at two adjacent moments and captures the maximum voltage value as a complete resonant point of the ultrasonic atomization sheet J, and then the microcontroller 2 controls the separately excited excitation module 3 to output at a frequency required by the complete resonant point, so that the ultrasonic atomization sheet J is in a complete resonant state. The voltage detection module 5 performs continuous detection so that the ultrasonic atomization sheet J always operates efficiently.

During the operation of the ultrasonic atomization sheet J, the frequency detection module 7 detects the frequency of the high-frequency separately excited excitation module 3 and then demodulates the frequency into low frequency, at this point, the voltage and the duty ratio of the driving signal output by the microcontroller 2 are proportional to the frequency, therefore the output frequency is adjusted by modulating the duty ratio. By tracking the relationship between the output frequency and the operating frequency of the ultrasonic atomization sheet J, the ultrasonic atomization sheet J always operates at a resonant point, which can improve the atomization efficiency, and the atomizing tobacco tar can generate larger amount of smoke.

Figure 8:
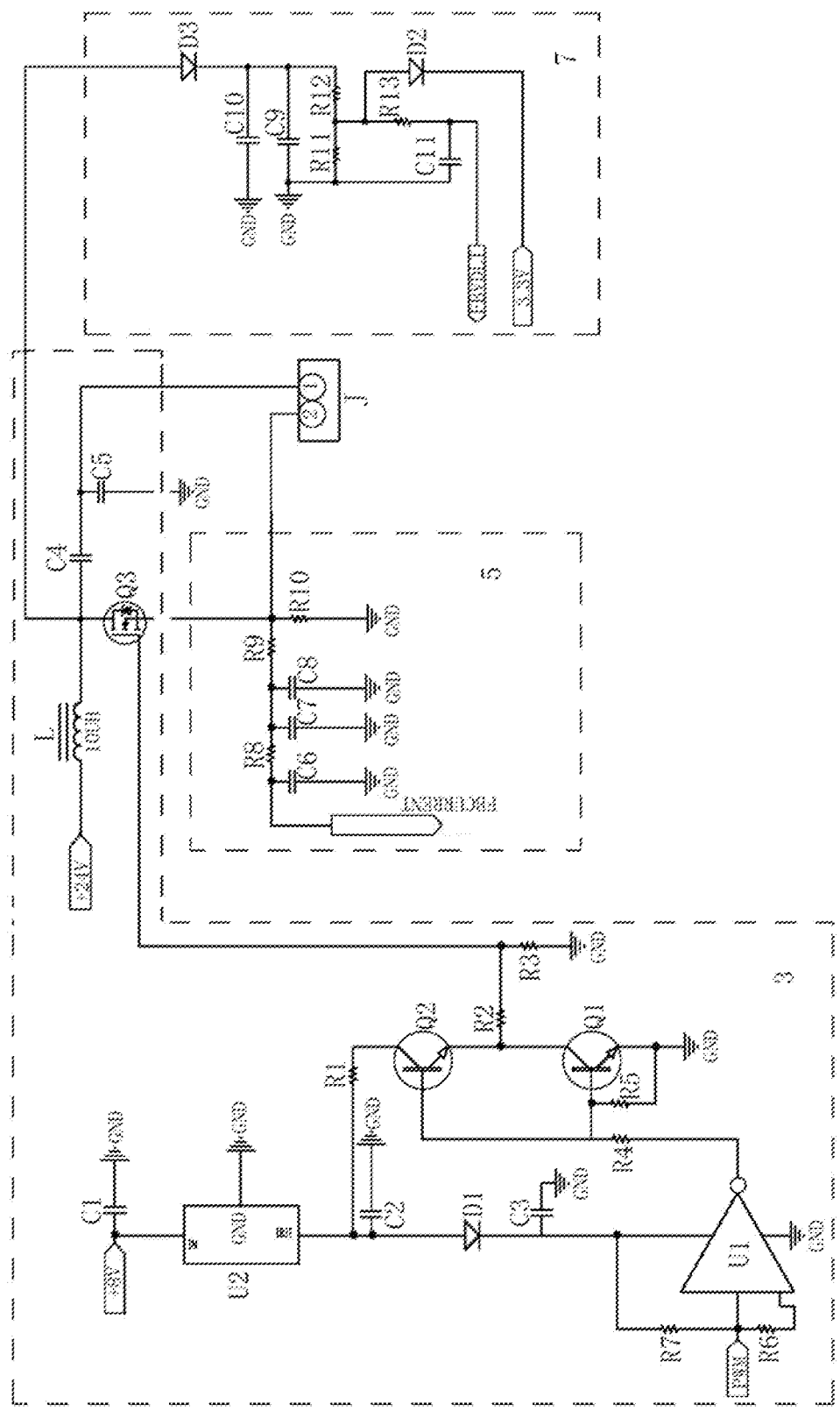
FIG. 8 is a schematic circuit diagram of the oscillation control circuit for ultrasonic atomization sheet of Embodiment 5.

FIG. 8 shows a schematic circuit diagram of the oscillation control circuit for ultrasonic atomization sheet of embodiment 5. The separately excited excitation module 3 includes an LDO linear buck chip U2, an inverter U1, a first NPN type triode Q1, a second NPN type triode Q2, and an MOS transistor Q3. A power module 1 is grounded through a first capacitor C1, an input terminal of the linear buck chip U2 is connected between the power module 1 and the first capacitor C1, an output terminal of the linear buck chip U2 is grounded through a second capacitor C2, and the output terminal of the linear buck chip U2 is also grounded through a first diode D and a third capacitor C3 in sequence. A collector of the second NPN type triode Q2 is electrically connected to the output terminal of the linear buck chip U2 through a first resistor R1, an emitter of the second NPN type triode Q2 is grounded through a second resistor R2 and a third resistor R3 in sequence, and a base of the second NPN type triode Q2 is electrically connected to an output terminal of the inverter U1 through a fourth resistor R4. A collector of the first NPN type triode Q1 is electrically connected to the emitter of the second NPN type triode Q2, a base of the first NPN type triode Q1 is electrically connected to the base of the second NPN type triode Q2, the base of the first NPN type triode Q1 is grounded through a fifth resistor R5, and an emitter of the first NPN type triode Q1 is grounded. A sixth resistor R6 is connected between a first input terminal of the inverter U1 and a second input terminal of the inverter U1, the second input terminal of the inverter U1 is electrically connected to the positive power supply terminal of the inverter U1 through a seventh resistor R7, and positive power supply terminal of the inverter U1 is connected between the first diode D and the third capacitor C3. The first output terminal of the microcontroller 2 is electrically connected to the second input terminal of the inverter U1. The DC boost module 4 is grounded through an inductor L, a fourth capacitor C4 and a fifth capacitor C5 in sequence. A drain electrode of the MOS transistor Q3 is connected between the inductor L and the fourth capacitor C4, a gate electrode of the MOS transistor Q3 is connected between the second resistor R2 and the third resistor R3, a first end of the ultrasonic atomization sheet J is connected between the fourth capacitor C4 and the fifth capacitor C5, a second end of the ultrasonic atomization sheet J and a source electrode of the MOS transistor Q3 are electrically connected to the voltage detection module 5.

The high-frequency separately excited excitation module 3 is composed of a signal driving portion and a high-frequency oscillation portion. The signal driving portion is composed of the inverter U1, the sixth resistor R6, the seventh resistor R7, the fourth resistor R4, the fifth resistor R5, the first resistor R1, the second resistor R2, the third resistor R3, the second NPN type triode Q2, and the first NPN type transistor Q1. The PWM signal outputted by the microcontroller 2 is phase reversed by the inverter U1 to form a stable square wave signal, and provides sufficient drive current to drive a totem circuit composed of the second NPN type triode Q2 and the first NPN type triode Q1. During the low-level period of the PWM, the second NPN type triode Q2 is turned on to drive the back high-frequency MOS transistor Q3 to operate. During the high-level period of the PWM, gate electrode of the high-frequency MOS transistor Q3 is conducted to the ground through the first NPN type triode Q1 for rapid discharge, to turn off the high-frequency MOS transistor Q3 quickly. The microcontroller 2 outputs high-frequency waves modulated from low frequency, to drive the high-frequency MOS transistor Q3 through the separately excited excitation module 3, transfer the electric energy to the ultrasonic atomization sheet J through the LC network, so that the ultrasonic atomization sheet J reaches a resonant state to atomize tobacco tar.

The voltage detection module 5 includes a sixth capacitor C6, a seventh capacitor C7, an eighth capacitor C8, an eighth resistor R8, a ninth resistor R9, and a tenth resistor R10, where the tenth resistor R10 is a sampling resistor, and the eighth resistor R8, the ninth resistor R9, the eighth capacitor C8, the seventh resistor R7 and the sixth resistor R6 compose a second-order RC filter network. The second end of the ultrasonic atomization sheet J and the source of the MOS transistor Q3 are grounded through the tenth resistor R10, the second end of the ultrasonic atomization sheet J and the source of the MOS transistor Q3 are electrically connected to the first input terminal of the microcontroller 2 through the ninth resistor R9 and the eighth resistor R8 in sequence; one end of the sixth capacitor C6 is connected between the eighth resistor R8 and the first input terminal of the microcontroller 2, and the other end of the sixth capacitor C6 is grounded; one end of the seventh capacitor C7 and one end of the eighth capacitor C8 are connected between the eighth resistor R8 and the ninth resistor R9, and the other end of the seventh capacitor C7 and the other end of the eighth capacitor C8 are both grounded. Whether the ultrasonic atomization sheet J is in a resonant state can be detected by the voltage detection module 5.

The frequency detection module 7 includes a ninth capacitor C9, a tenth capacitor C10, an eleventh capacitor C11, a second diode D2, a third diode D3, an eleventh resistor R11, a twelfth resistor R12, and a thirteenth resistor R13. The drain electrode of the MOS transistor Q3 is electrically connected to an anode of the third diode D3, one end of the ninth capacitor C9 and one end of the tenth capacitor C10 are both grounded, the other end of the ninth capacitor C9 and the other end of the tenth capacitor C10 are electrically connected to a cathode of the third diode D3, the eleventh resistor R11 and the twelfth resistor R12 are connected into a series branch, one end of the series branch is electrically connected to the cathode of the third diode D3, the other end of the series branch is grounded, one end of the thirteenth resistor R13 is connected between the eleventh resistor R11 and the twelfth resistor R12, the other end of the thirteenth resistor R13 is grounded through the eleventh capacitor C11, and the second input terminal of the microcontroller 2 is connected between the thirteenth resistor R13 and the eleventh capacitor C11. An anode of the second diode D2 is connected between the eleventh resistor R11 and the twelfth resistor R12, and a cathode of the second diode D2 is electrically connected to the power module 1.

In the frequency detection module 7, the third diode D3, the tenth capacitor C10 and the ninth capacitor C9 compose a detection network, the eleventh resistor R11 and the twelfth resistor R12 compose a voltage dividing network, and the thirteenth resistor R13 and the eleventh capacitor C11 compose an RC filter network. The detection network demodulates a low frequency, the voltage is reduced by the voltage dividing network and then becomes stable DC voltage through the RC filter network, and this voltage is proportional to the duty ratio and frequency of the driving signal output by the microcontroller 2.

The embodiments of the present invention are described above with reference to the drawings, but the present invention is not limited to the specific embodiments. The specific embodiments described above are merely illustratively but not restrictively. Many forms may also be made by those of ordinary skill in the art under the enlightenment of the present invention without departing from the purpose of the present invention and the scope of the claims, and these forms fall into the scope of the present invention.

The invention claimed is:

1. An oscillation control circuit for an ultrasonic atomization sheet, comprising a DC boost module (4), a separately excited excitation module (3), and a microcontroller (2), wherein a power module (1) is electrically connected to the ultrasonic atomization sheet (J) through the DC boost module (4) and the separately excited excitation module (3) in sequence, and a control terminal of the separately excited excitation module (3) is electrically connected to a first output terminal of the microcontroller (2).

2. The oscillation control circuit for an ultrasonic atomization sheet according to claim 1, further comprising a voltage detection module (5), wherein the ultrasonic atomization sheet (J) is electrically connected to a first input terminal of the microcontroller (2) through the voltage detection module (5).

3. The oscillation control circuit for an ultrasonic atomization sheet according to claim 2, further comprising a frequency detection module (7), wherein a detection terminal of the frequency detection module (7) is electrically connected to the separately excited excitation module (3), and an output terminal of the frequency detection module (7) is electrically connected to a second input terminal of the microcontroller (2).

4. The oscillation control circuit for an ultrasonic atomization sheet according to claim 2, further comprising a current detection module (6), wherein the DC boost module (4) is electrically connected to the separately excited excitation module (3) through the current detection module (6), and an output terminal of the current detection module (6) is electrically connected to a third input terminal of the microcontroller (2).

5. The oscillation control circuit for an ultrasonic atomization sheet according to claim 1, wherein a control terminal of the DC boost module (4) is electrically connected to a second output terminal of the microcontroller (2).

6. The oscillation control circuit for an ultrasonic atomization sheet according to claim 1, wherein the separately excited excitation module (3) comprises a first diode (D1), a second diode (D2), a first capacitor (C1), a first inductor (L1) and a first MOS transistor (Q4), and wherein an anode of the first diode (D1) is electrically connected to an output terminal of the DC boost module (4), a cathode of the first diode (D1) is grounded through the first inductor (L1), the first capacitor (C1) and the second diode (D2) in sequence, the ultrasonic atomization sheet (J) is connected in parallel to each end of the second diode (D2), a drain electrode of the first MOS transistor (Q4) is connected between the first inductor (L1) and the first capacitor (C1), a source electrode of the first MOS transistor (Q4) is grounded, and a gate electrode of the first MOS transistor (Q4) is electrically connected to the first output terminal of the microcontroller (2).

7. The oscillation control circuit for an ultrasonic atomization sheet according to claim 1, wherein the separately excited excitation module (3) comprises a resistor (R), a second capacitor (C2), a third capacitor (C3), a second inductor (L2) and a second MOS transistor (Q5), and wherein the DC boost module (4) is grounded through the second inductor (L2), the third capacitor (C3) and the second capacitor (C2) in sequence, a drain electrode of the second MOS transistor (Q5) is connected between the second inductor (L2) and the third capacitor (C3), a source electrode of the second MOS transistor (Q5) is grounded through the resistor (R), a gate electrode of the second MOS transistor (Q5) is electrically connected to the first output terminal of the microcontroller (2), one end of the ultrasonic atomization sheet (J) is connected between the second capacitor (C2) and the third capacitor (C3), and the other end of the ultrasonic atomization sheet (J) is connected between the drain electrode of the second MOS transistor (Q5) and the resistor (R).

8. The oscillation control circuit for an ultrasonic atomization sheet according to claim 4, wherein the separately excited excitation module (3) comprises a linear buck chip (U2), an inverter (U1), a first NPN type triode (Q1), a second NPN type triode (Q2) and an MOS transistor (Q3), and wherein the power module (1) is grounded through a first capacitor (C1), an input terminal of the linear buck chip (U2) is connected between the power module (1) and the first capacitor (C1), an output terminal of the linear buck chip (U2) is grounded through a second capacitor (C2), the output terminal of the linear buck chip (U2) is also grounded through a diode (D) and a third capacitor (C3) in sequence, a collector of the second NPN type triode (Q2) is electrically connected to the output terminal of the linear buck chip (U2) through a first resistor (R1), an emitter of the second NPN type triode (Q2) is grounded through a second resistor (R2) and a third resistor (R3) in sequence, a base of the second NPN type triode (Q2) is electrically connected to an output terminal of the inverter (U1) through a fourth resistor (R4), a collector of the first NPN type triode (Q1) is electrically connected to the emitter of the second NPN type triode (Q2), a base of the first NPN type triode (Q1) is electrically connected to the base of the second NPN type triode (Q2), the base of the first NPN type triode (Q1) is grounded through a fifth resistor (R5), and an emitter of the first NPN type triode (Q1) is grounded, and wherein a sixth resistor (R6) is connected between a first input terminal of the inverter (U1) and a second input terminal of the inverter (U1), the second input terminal of the inverter (U1) is electrically connected to a positive power supply terminal of the inverter (U1) through a seventh resistor (R7), and the positive power supply terminal of the inverter (U1) is connected between the diode (D) and the third capacitor (C3), and wherein the first output terminal of the microcontroller (2) is electrically connected to the second input end of the inverter (U1), and wherein the DC boost module (4) is grounded through an inductor (L), a fourth capacitor (C4) and a fifth capacitor (C5) in sequence, a drain electrode of the MOS transistor (Q3) is connected between the inductor (L) and the fourth capacitor (C4), a gate electrode of the MOS transistor (Q3) is connected between the second resistor (R2) and the third resistor (R3), a first terminal of the ultrasonic atomization sheet (J) is connected between the fourth capacitor (C4) and the fifth capacitor (C5), and a second terminal of the ultrasonic atomization sheet (J) and a source electrode of the MOS transistor (Q3) are both electrically connected to the voltage detection module (5).

9. The oscillation control circuit for an ultrasonic atomization sheet according to claim 8, wherein the voltage detection module (5) comprises a sixth capacitor (C6), a seventh capacitor (C7), an eighth capacitor (C8), an eighth resistor (R8), a ninth resistor (R9), and a tenth resistor (R10), and wherein the second terminal of the ultrasonic atomization sheet (J) and the source electrode of the MOS transistor (Q3) are both grounded through the tenth resistor (R10), the second terminal of the ultrasonic atomization sheet (J) and the source electrode of the MOS transistor (Q3) are both electrically connected to the first input terminal of the microcontroller (2) through the ninth resistor (R9) and the eighth resistor (R8) in sequence, and wherein one end of the sixth capacitor (C6) is connected between the eighth resistor (R8) and the first input terminal of the microcontroller (2), and the other end of the sixth capacitor (C6) is grounded, and wherein one end of the seventh capacitor (C7) and one end of the eighth capacitor (C8) are connected between the eighth resistor (R8) and the ninth resistor (R9), and wherein the other end of the seventh capacitor (C7) and the other end of the eighth capacitor (C8) are both grounded.

10. The oscillation control circuit for an ultrasonic atomization sheet according to claim 4, wherein the current detection module (6) comprises an operational amplifier (U3), a ninth capacitor (C9), a tenth capacitor (C10), an eleventh capacitor (C11), a twelfth capacitor (C12), an eleventh resistor (R11), a twelfth resistor (R12), a thirteenth resistor (R13), and a fourteenth resistor (R14) and wherein one end of the ninth capacitor (C9) and one end of the tenth capacitor (C10) are connected between the DC boost module (4) and one end of the eleventh resistor (R11), the other end of the ninth capacitor (C9) and the other end of the tenth capacitor (C10) are both grounded, the other end of the eleventh resistor (R11) is connected to the separately excited excitation module (3) and electrically connected to the reversed-phase input terminal of the operational amplifier (U3) through the fourteenth resistor (R14), the in-phase input terminal of the operational amplifier (U3) is electrically connected to the DC boost module (4) through the twelfth resistor (R12), an output terminal of the operational amplifier (U3) is electrically connected to the third input end of the microcontroller (2) through the thirteenth resistor (R13), and the third input terminal of the microcontroller (2) is also grounded through the eleventh capacitor (C11), and wherein the positive power supply terminal of the operational amplifier (U3) is grounded through the twelfth capacitor (C12).

11. The oscillation control circuit for an ultrasonic atomization sheet according to claim 4, wherein the current detection module (6) comprises a Hall current sensor (U4), a thirteenth capacitor (C13), a fourteenth capacitor (C14), a fifteenth capacitor (C15), a sixteenth capacitor (C16) and a fifteenth resistor (R15), and wherein one end of the thirteenth capacitor (C13) and one end of the fourteenth capacitor (C14) are electrically connected to the DC boost module (4), the other end of the thirteenth capacitor (C13) and the other end of the fourteenth capacitor (C14) are both grounded, the DC boost module (4) is electrically connected to the separately excited excitation module (3) through the Hall current sensor (U4), an output terminal of the Hall current sensor (U4) is grounded through the fifteenth resistor (R15) and the sixteenth capacitor (C16) in sequence, the third input terminal of the microcontroller (2) is connected between the fifteenth resistor (R15) and the sixteenth capacitor (C16), and the positive power supply terminal of the Hall current sensor (U4) is grounded through the fifteenth capacitor (C15).

12. The oscillation control circuit for an ultrasonic atomization sheet according to claim 3, wherein the separately excited excitation module (3) comprises a linear buck chip (U2), an inverter (U1), a first NPN type triode (Q1), a second NPN type triode (Q2) and an MOS transistor (Q3), and wherein the power module (1) is grounded through a first capacitor (C1), an input terminal of the linear buck chip (U2) is connected between the power module (1) and the first capacitor (C1), an output terminal of the linear buck chip (U2) is grounded through a second capacitor (C2), the output terminal of the linear buck chip (U2) is also grounded through a first diode (D1) and a third capacitor (C3) in sequence, a collector of the second NPN type triode (Q2) is electrically connected to the output terminal of the linear buck chip (U2) through a first resistor (R1), an emitter of the second NPN type triode (Q2) is grounded through a second resistor (R2) and a third resistor (R3) in sequence, a base of the second NPN type triode (Q2) is electrically connected to an output terminal of the inverter (U1) through a fourth resistor (R4), a collector of the first NPN type triode (Q1) is electrically connected to the emitter of the second NPN type triode (Q2), a base of the first NPN type triode (Q1) is electrically connected to the base of the second NPN type triode (Q2), the base of the first NPN type triode (Q1) is grounded through a fifth resistor (R5), and an emitter of the first NPN type triode (Q1) is grounded, and wherein a sixth resistor (R6) is connected between a first input terminal of the inverter (U1) and a second input terminal of the inverter (U1), and wherein the second input terminal of the inverter (U1) is electrically connected to the positive power supply terminal of the inverter (U1) through a seventh resistor (R7), and the positive power supply terminal of the inverter (U1) is connected between the first diode (D) and the third capacitor (C3), and wherein the first output terminal of the microcontroller (2) is electrically connected to the second input terminal of the inverter (U1), and wherein the DC boost module (4) is grounded through an inductor (L), a fourth capacitor (C4) and a fifth capacitor (C5) in sequence, a drain electrode of the MOS transistor (Q3) is connected between the inductor (L) and the fourth capacitor (C4), a gate electrode of the MOS transistor (Q3) is connected between the second resistor (R2) and the third resistor (R3), a first end of the ultrasonic atomization sheet (J) is connected between the fourth capacitor (C4) and the fifth capacitor (C5), and wherein a second end of the ultrasonic atomization sheet (J) and a source electrode of the MOS transistor (Q3) are both electrically connected to the voltage detection module (5).

13. The oscillation control circuit for an ultrasonic atomization sheet according to claim 12, wherein the voltage detection module (5) comprises a sixth capacitor (C6), a seventh capacitor (C7), an eighth capacitor (C8), an eighth resistor (R8), a ninth resistor (R9), and a tenth resistor (R10), and wherein the second end of the ultrasonic atomization sheet (J) and the source electrode of the MOS transistor (Q3) are both grounded through the tenth resistor (R10), and the second end of the ultrasonic atomization sheet (J) and the source electrode of the MOS transistor (Q3) are both electrically connected to the first input terminal of the microcontroller (2) through the ninth resistor (R9) and the eighth resistor (R8) in sequence, and wherein one end of the sixth capacitor (C6) is connected between the eighth resistor (R8) and the first input terminal of the microcontroller (2), and the other end of the sixth capacitor (C6) is grounded, and wherein one end of the seventh capacitor (C7) and one end of the eighth capacitor (C8) are both connected between the eighth resistor (R8) and the ninth resistor (R9), and wherein the other end of the seventh capacitor (C7) and the other end of the eighth capacitor (C8) are both grounded.

14. The oscillation control circuit for an ultrasonic atomization sheet according to claim 12, wherein the frequency detection module (7) comprises a ninth capacitor (C9), a tenth capacitor (C10), an eleventh capacitor (C11), a second diode (D2), a third diode (D3), an eleventh resistor (R11), a twelfth resistor (R12), and a thirteenth resistor (R13), and wherein the drain electrode of the MOS transistor (Q3) is electrically connected to an anode of the third diode (D3), one end of the ninth capacitor (C9) and one end of the tenth capacitor (C10) are both grounded, the other end of the ninth capacitor (C9) and the other end of the tenth capacitor (C10) are both electrically connected to a cathode of the third diode (D3), the eleventh resistor (R11) and the twelfth resistor (R12) are connected into a series branch, one end of the series branch is electrically connected to the cathode of the third diode (D3), the other end of the series branch is grounded, one end of the thirteenth resistor (R13) is connected between the eleventh resistor (R11) and the twelfth resistor (R12), the other end of the thirteenth resistor (R13) is grounded through the eleventh capacitor (C11), and the second input terminal of the microcontroller (2) is connected between the thirteenth resistor (R13) and the eleventh capacitor (C11), and wherein an anode of the second diode (D2) is connected between the eleventh resistor (R11) and the twelfth resistor (R12), and a cathode of the second diode (D2) is electrically connected to the power module (1).

15. An ultrasonic electronic cigarette, comprising the oscillation control circuit for an ultrasonic atomizing sheet according to claim 1.

16. The ultrasonic electronic cigarette according to claim 15, further comprising a voltage detection module (5), wherein the ultrasonic atomization sheet (J) is electrically connected to a first input terminal of the microcontroller (2) through the voltage detection module (5).

17. The ultrasonic electronic cigarette according to claim 16, further comprising a frequency detection module (7), wherein a detection terminal of the frequency detection module (7) is electrically connected to the separately excited excitation module (3), and an output terminal of the frequency detection module (7) is electrically connected to a second input terminal of the microcontroller (2).

18. The ultrasonic electronic cigarette according to claim 16, further comprising a current detection module (6), wherein the DC boost module (4) is electrically connected to the separately excited excitation module (3) through the current detection module (6), and an output terminal of the current detection module (6) is electrically connected to a third input terminal of the microcontroller (2).

19. The ultrasonic electronic cigarette according to claim 15, wherein a control terminal of the DC boost module (4) is electrically connected to a second output terminal of the microcontroller (2).

* * * * *